United States Patent [19]

Croso et al.

[11] 3,764,828

[45] Oct. 9, 1973

[54] SWITCH FOR A SUPERCONDUCTING CIRCUIT

[75] Inventors: Hubert Croso, Ris-Orangis; Gérard Prost, Fresnes; André Queffelec, Villeneuve St-Georges; Jean Sole, Clamart, all of France

[73] Assignee: Commissariat A L'Energie Atomique, Paris, France

[22] Filed: June 13, 1972

[21] Appl. No.: 262,197

[30] Foreign Application Priority Data

June 16, 1971 France ..........................7121821

[52] U.S. Cl. .................... 307/245, 307/306, 338/32
[51] Int. Cl. ........................ H03k 17/78, H03k 3/38
[58] Field of Search .................... 307/212, 245, 277, 307/306; 338/32

[56] References Cited

UNITED STATES PATENTS

| | | | |
|---|---|---|---|
| 3,310,767 | 3/1967 | Buchhold | 307/245 X |
| 2,914,735 | 11/1959 | Young | 307/212 X |
| 3,037,127 | 5/1962 | Logue et al. | 307/277 |
| 3,166,738 | 1/1965 | Slade | 307/277 X |

*Primary Examiner*—John Zazworsky
*Attorney*—William B. Kerkam, Jr.

[57] ABSTRACT

A superconducting wire arranged in parallel horizontal layers of adjacent turns so as to form a toroidal winding is surrounded by an external switching winding, the consecutive turns of which extend in planes substantially at right angles to the planes of the superconducting winding. The external winding is constituted by a series of elemental windings n mounted in parallel and each carrying a current $I/n$, wherein $I$ is the current required for producing the switching field $H$.

1 Claim, 2 Drawing Figures

PATENTED OCT 9 1973 3,764,828

SWITCH FOR A SUPERCONDUCTING CIRCUIT

Figure 1:
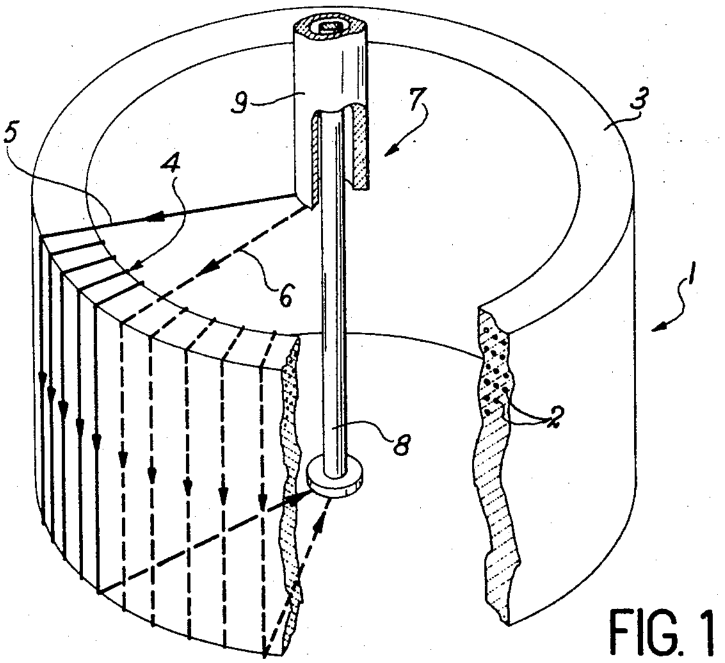

This invention relates to a switch for a superconducting circuit.

It is known that, in order to cause a superconducting circuit to shift from the superconducting state to the normal-conducting state, it is standard practice to subject either all or part of this circuit to a magnetic field or to a temperature rise, the value of which exceeds that of the field or of the critical temperature. The circuit thus loses its superconducting properties and reverts to the normal state in which its electrical resistance in particular is no longer zero ; in the case of a closed loop with an electric current flowing therein without loss of energy, it thus becomes an open circuit. Similarly, by restoring the conditions of field and temperature to their initial state, the circuit is again completely closed in the same manner as a conventional arrangement which makes use of a mechanical switch or the like.

In the event that the circuit-switching parameter is the magnetic field, steps should be taken to ensure on the one hand that the value $H$ of this field is very rapidly attained so as to cause positive opening of the circuit and, on the other hand, that the value of said field is substantially uniform throughout the volume $M$ defined by the circuit or the portion of circuit which constitutes the switch. In particular, in order that unacceptable induced voltages should not be developed in the superconductor, the magnetic induction vector must be parallel to the portion of circuit considered and usually consisting of one or a number of wires of superconducting material.

In order to achieve maximum compliance with the foregoing conditions, it has already been proposed to form the superconducting circuit by means of a winding of superconducting wires wound in consecutive turns and either surrounded by or embedded in a support formed of insulating or non-superconducting material, the shape of the winding being either that of a toroid or more generally that of a solid of revolution about an axis, the turns of the winding being such as to extend along planes at right angles to said axis. The switch designed for a circuit of this type is formed by an external switching winding, this latter being wound around the solid of revolution in one or a number of planes which pass through the axis of the solid of revolution and are therefore substantially perpendicular to the planes containing the turns of the superconducting winding. Advantageously, the external switching winding is made up of a layer of $n$ wires mounted in parallel, said layer being wound in $N$ turns along the superconducting circuit ; the use of a layer formed of a number of wires has the effect of limiting the self-induction of the switching winding and also of reducing the number of turns required.

By virtue of the arrangements mentioned above, the field produced by the external winding is thus approximately parallel to the wires which constitute the turns of the superconducting winding. However, for obvious constructional reasons, the turns of this external winding do not in fact make an angle of 90° with the turns of the superconducting circuit. This results in an axial component of the magnetic field produced, with the result that the undesirable induced voltages mentioned earlier are introduced into this circuit. In fact, if the total current of the layer of wires of the switching winding is $I$, and if $N$ is the number of turns in said winding, it is postulated that the number of useful ampere-turns required in order to produce the switching field is :

$$ATu = NI \quad (1)$$

The displacement of the current of said winding about the axis of revolution of the solid which forms the superconducting circuit produces under these conditions an axial stray field corresponding to a number of ampere-turns $$ATp = I \times 1 \quad (2)$$

The present invention is concerned with a switch for a superconducting circuit which prevents the generation of disturbing induced voltages by virtue of a considerable reduction and even total elimination of the axial component of the switching field which is produced.

To this end, the switch under consideration is characterized in that the external switching winding is constituted by a series of $n$ elemental windings mounted in parallel and each carrying a current $I/n$, wherein $I$ is the current which is necessary for producing the switching field $H$.

Each elemental winding can itself be made up of $N$ turns. The number of useful ampere-turns for obtaining the field $H$ remains unchanged. In fact, we have $$ATu = I/n \times n \times N = NI \quad (3)$$

On the other hand, the stray field produced by the displacement of the current is accordingly :

$$ATp = I/n \times 1 = I/n \quad (4)$$

namely divided by $n$ if a comparison is made between relations (2) and (4).

In order to limit the value of the stray field to an even greater extent and in order to make this value strictly zero, it is possible in addition, and in accordance with another characteristic feature of the invention, to form the elemental windings of the switching circuit in such manner as to ensure that the direction of the turns of each elemental winding is reversed from one winding to the next, the total number of elemental windings being an even number. In this case, the axial components of the magnetic inductions produced within the elemental windings are in opposite directions in pairs and cancel each other. Moreover, an arrangement of this type offers an advantage in that the potential gradient between two adjacent conductors within the successive elemental windings is reduced in order that, in particular, the two contacting wires of two adjacent elemental windings should always be at the same potential whereas, in conventional windings, the two end conductors are subjected to the total potential difference which permits production of the switching field.

Figure 2:
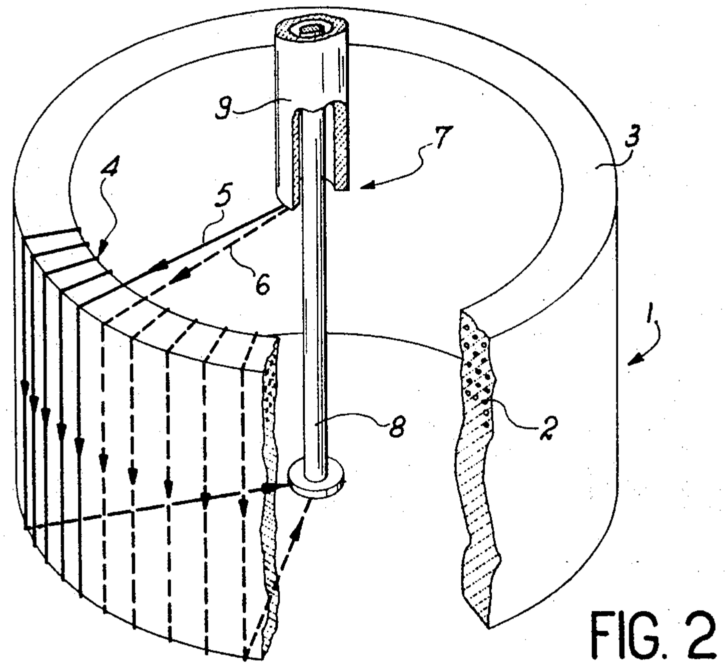

Further characteristic features of a switch for a superconducting circuit as constructed in accordance with the invention will become apparent from the following description of two exemplified embodiments which are given hereinafter by way of indication but without any implied limitation, reference being made to the accompanying drawings in which FIGS. 1 and 2 are diagrammatic views in perspective showing two alternative forms of construction of the switch under consideration.

In these figures, the reference numeral 1 designates a superconducting circuit constituted by a winding which comprises a series of adjacent and consecutive turns of a superconducting wire 2 arranged in parallel layers which extend in substantially horizontal planes. These turns of superconducting wire are embedded in a supporting material 3 which may be either conducting or insulating but is in any case non-superconducting. The circuit as a whole takes the form of a solid of revolution having the shape of a cylinder 3 in the examples of construction which are more especially considered. In other alternative forms, said solid could in particular have the shape of a torus.

In order to cause the superconducting circuit which is thus formed to shift from the superconducting state to the normal state, there is placed around the cylinder 3 a switching winding 4 formed by a series of turns of a suitable conductive wire. In addition, and in accordance with a characteristic arrangement of the invention, said winding 4 is divided into a plurality of adjacent elemental windings, only two of which appear in the drawings and are designated by the reference numerals 5 and 6. The ends of each elemental winding aforesaid are connected to an axial electric cable 7 having a central core 8 and an outer conductor 9 ; said cable thus makes it possible to establish a suitable voltage between the ends of the elemental windings, said voltage being the same for all the elemental windings which are mounted in parallel.

Under these conditions, the magnetic induction produced by each elemental winding aforesaid is substantially parallel to the direction of the superconducting wire 2 which constitutes the circuit 1. Moreover, the subdivision of the switching winding into adjacent elemental windings mounted in parallel makes it possible to reduce the stray axial field produced, with a factor equal to the number of said windings.

In the alternative form of construction illustrated in FIG. 2, the elemental windings 5 and 6 of the switching winding 4 are wound in this case in the opposite direction from one to the other, with the result that the displacement of currents which produces the axial induction within each winding accordingly takes place in opposite directions and that the total parasitic induction can be reduced to zero with an even number for the total number of elemental windings. Moreover, the reversal of direction of the elemental windings limits the voltage gradient between adjacent conductors, this voltage being equal at a maximum value to $V/n$ if $V$ is the voltage established between the conductors of the cable 7 to which all the elemental windings are connected in parallel and $n$ is the number of turns of each of said windings.

Preferably, the superconducting circuit is fabricated from a non-isulated niobium-titanium superconducting wire having a diameter of 270 $\mu$ and a resistivity of 70 $\times 10^{-6}$ $\Omega$ cm, said wire being arranged so as to form conductive bands of parallel wires. In one particular example of construction, 12 wires in parallel were employed in each band with a length of band of 87 m, thus resulting in a total length of wire of 1,044 m and a volume of superconducting material of 58 $cm^3$. This circuit in the form of a toroidal coil as illustrated in FIG. 1 or FIG. 2 was designed in the form of a cylindrical body having a height of 380 mm, a diameter of 310 mm and a thickness of 5 mm, with four double layers of 10 turns separated by packing strips of polyethylene having a thickness of 2 mm and a width of 20 mm. Insulation between the layers in each double layer is effected by means of an adhesive element of the polyester sheet type which serves to ensure that the superconducting wires are suitably positioned in each band.

So far as the switching winding is concerned, this latter has been constructed with an insulated and sheathed copper cable having cross-sections equal to 339 $mm^2$ and distributed in 38 elemental coils each formed of six turns. The resistance of the switch in the normal state was 90 $\Omega$, the cubic current was 1,580 A, the specific power was $3.38 \times 10^{-6}$ $W/cm^3$ and finally the switching time was of the order of 1 $\mu$sec.

It is readily understood that the invention is not limited in any sense to the examples of construction which have been more especially described with reference to the drawings but extends, on the contrary, to all alternative forms.

What we claim is :

1. A switch for a superconducting circuit having a superconducting conductor arranged in layers extending in parallel planes and constituting an element of revolution about an axis, comprising an external switching winding when a magnetic field $H$ is produced, said winding being wound in consecutive turns extending in planes substantially at right angles to the planes of the layers of the superconducting conductor, said external switching winding having a series of $n$ elemental windings mounted in parallel and each carrying a current $I/n$, $I$ being the current producing the switching field $H$, said elemental windings having the direction of the turns of each elemental winding reversed from one winding to the next, the total number of elemental windings being an even number.

* * * * *